Aug. 22, 1944.    L. M. PAYNE    2,356,609
AUTOMOBILE BODY HEATER
Filed Feb. 27, 1937    2 Sheets-Sheet 1
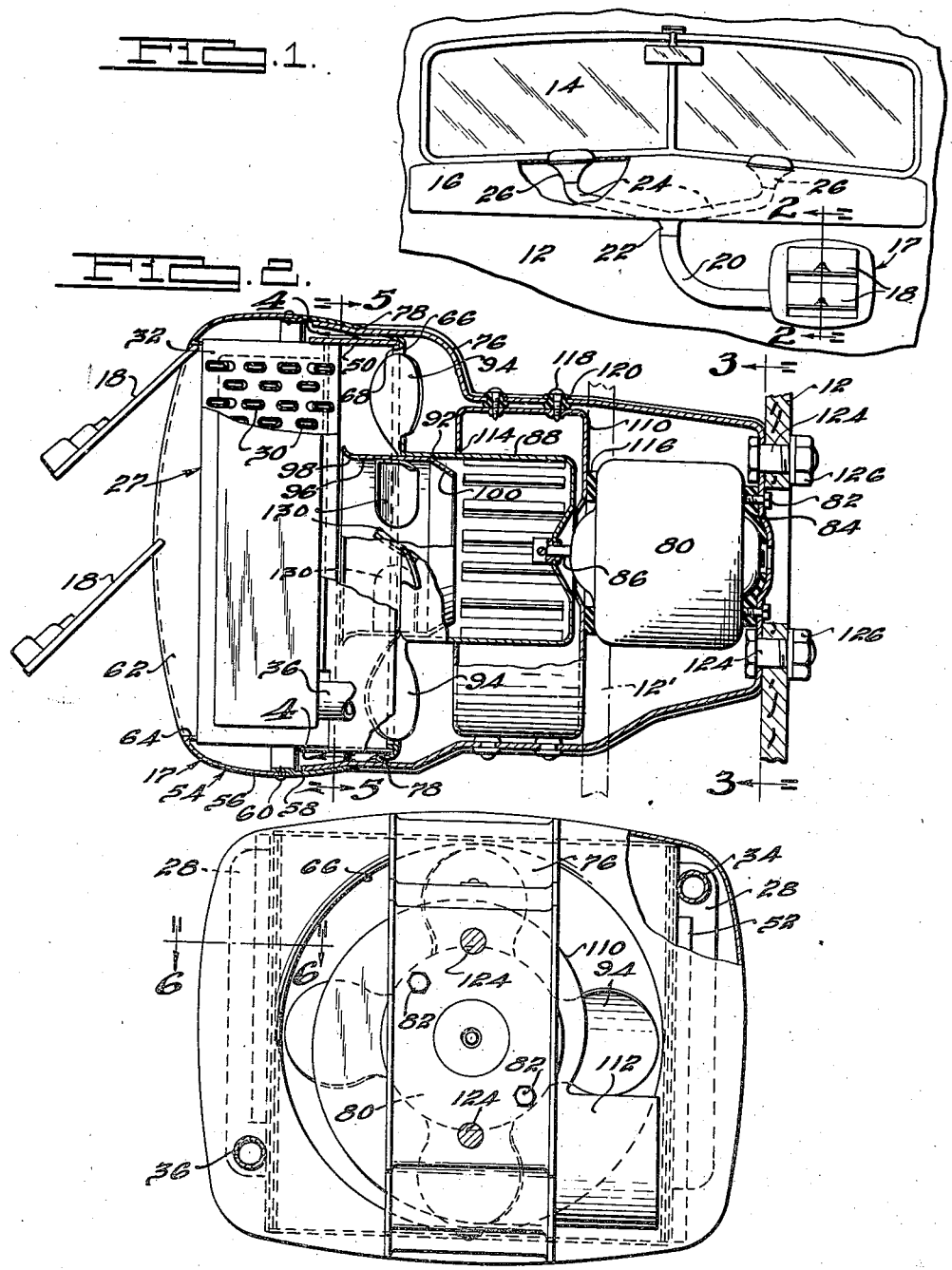
INVENTOR
Lambert M. Payne.
BY
Harness, Dickey & Pierce
ATTORNEYS.

Aug. 22, 1944.   L. M. PAYNE   2,356,609
AUTOMOBILE BODY HEATER
Filed Feb. 27, 1937   2 Sheets-Sheet 2
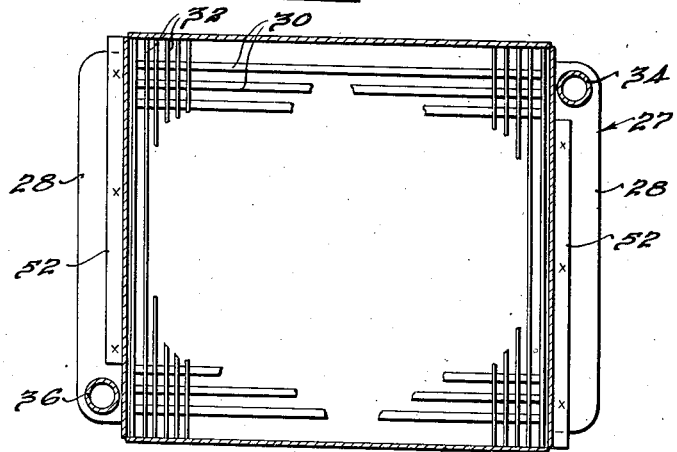
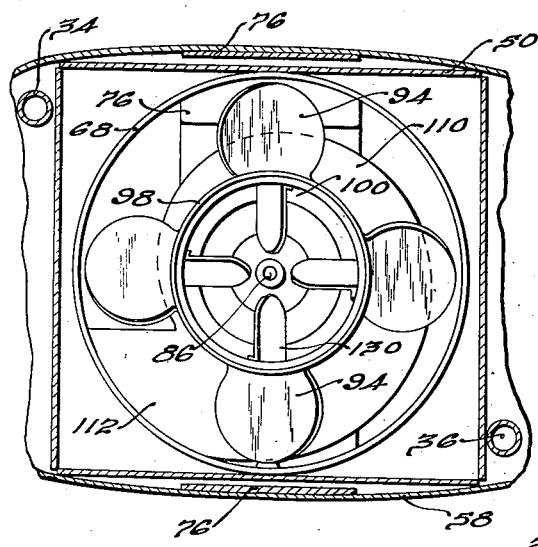
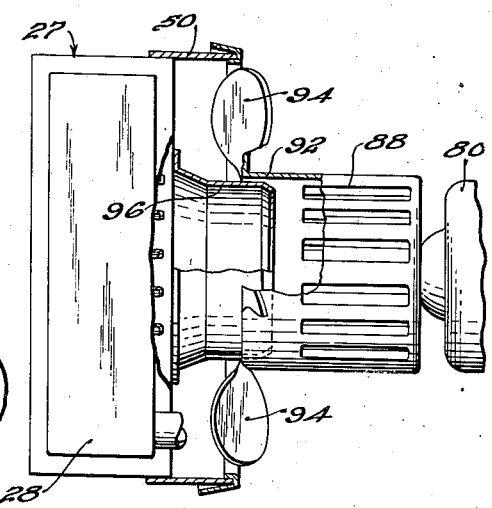
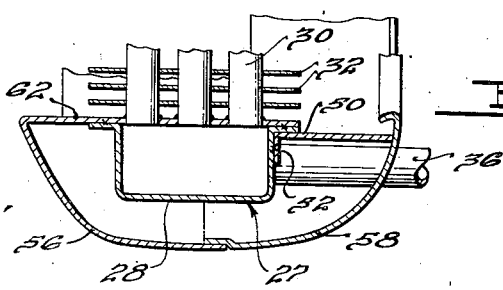
INVENTOR
Lambert M. Payne.
BY
Harness, Dickey & Pierce.
ATTORNEYS.

Patented Aug. 22, 1944

2,356,609

UNITED STATES PATENT OFFICE 2,356,609

AUTOMOBILE BODY HEATER

Lambert M. Payne, Detroit, Mich.

Application February 27, 1937, Serial No. 128,077

4 Claims. (Cl. 257—137)

This invention relates to heaters for automobile bodies and particularly to a new and novel construction that is efficient in operation, simply in construction and economical to manufacture.

Other objects of the invention include the provision of a heating device for the interior of an automobile body including a radiator, a fan in conjunction therewith for circulating air through the heater and delivering it to the interior of the automobile body for the purpose of raising the temperature of the air in the automobile body, together with cooperating fan means adapted to withdraw a portion of the air heated by the radiator and to discharge it as an independent stream to a predetermined and desired location; the provision of a structure of the type described in which one of the fans is formed as an integral part of the other of the fans; the provision of a structure as above described in which a centrifugal type of fan is provided with the axial flow type of blade in conjunction therewith; and the provision of a structure as above described in which the auxiliary stream of air is created by a centrifugal type of fan having an extended horn or cone forming an air intake passage therefor and which horn or cone is provided with axial fan type of blade mounted thereon and rotatable therewith.

Other objects of the invention include the provision of an automobile body heater construction including a heat exchange radiator, a motor mounted rearwardly thereof, a centrifugal type of fan element between the motor and the radiator and driven by the motor, a housing surrounding the centrifugal fan element and providing an air collecting chamber for the air discharged through the centrifugal element, the centrifugal fan element projecting from the casing toward the radiator and exteriorly of the casing being provided with axial flow type of fan blade for forcing air from a point between said casing and the radiator through the radiator; and the provision of a heater construction for an automobile body including a heat exchange radiator, a motor spaced therefrom, a fan element between the radiator and motor driven by the motor, a casing for the fan element for receiving the air discharged thereby, and a second fan element carried by the first fan element exteriorly of the casing between the casing and the radiator and adapted to blow air from between said casing and said radiator outwardly through said radiator, in combination with conduit means extending between the casing and the radiator providing a path of flow separate from the air blown through the radiator by the second fan element for conducting air from the radiator to the first fan element.

Further objects of the invention include the provision of an automobile body heater comprising a single heat exchanging radiator and an axial flow type of fan for forcing air through the radiator for the purpose of heating the bulk of the air in the interior of the automobile, together with means for passing air through the central portion of the radiator only and to discharge it as a separate stream at a predetermined location; the provision of an automobile body heater including a radiator together with means for creating two distinct air streams through it, means for creating one of the air streams comprising an axial flow type of fan and the other causing air to flow through that portion of the radiator adjacent the hub of the mentioned fan where the efficiency of such fan is at a minimum; and the provision of an automobile body heater construction having means for producing a main current of air and an auxiliary current of air and in which the main current of air is created by an axial flow type of fan and the auxiliary flow of air is created by a second fan which draws its supply of air through the radiator in the central portion of the area circumscribed by the first mentioned fan during rotation.

Still further objects of the present invention include the provision of an automobile body heater having means for providing an independent flow of air for auxiliary purposes in which one end of the heater is of materially smaller dimensions than the face end thereof whereby to facilitate the accommodation of the heater in an automobile body; and to provide a construction of the type described whereby a portion of the heater may be projected through the dash of an automobile without necessitating the provision of an opening in the dash of a size commensurate with the projected transverse area of the heater assembly.

The above being among the objects of the present invention, the same consists in certain novel features of construction and combinations of parts to be hereinafter described with reference to the accompanying drawings and then claimed, having the above and other objects in view.

In the accompanying drawings which illustrate suitable embodiments of the present invention and in which like numerals refer to like parts throughout the several different views, Figure 1 is a fragmentary partially broken, partially sectioned more or less diagrammatic view taken from the interior of an automobile body, looking toward the windshield and dash thereof, showing a suitable application of the present invention thereto so as to permit heating of the bulk of air within the automobile body as well as directing independent streams of heated air against the inner face of the windshield therefor;

Fig. 2 is an enlarged vertical sectional view taken centrally through the automobile body heater shown in Fig. 1 as on the line 2—2 thereof;

Fig. 3 is a rear view of the heater shown in Fig. 2 taken as on the line 3—3 of Fig. 2;

Fig. 4 is a vertical sectional view taken on the line 4—4 of Fig. 2 looking toward the front face of the heater and showing only the radiator or heat exchange unit and its supporting frame;

Fig. 5 is a vertical sectional view taken transversely through the heater as on the line 5—5 of Fig. 2;

Fig. 6 is an enlarged fragmentary, sectional view taken through one side of the heater as on the line 6—6 of Fig. 3; and Fig. 7 is a fragmentary, partially broken, partially sectioned view corresponding to a portion of the view shown in Fig. 2 and illustrating a modified form of the invention.

In automobile body heaters of the type including a radiator heated by steam or hot water and a motor driven fan which circulates air in the body through the radiator for the purpose of heating the same it has become increasingly popular in recent years to provide means for directing a portion of the air heated from the radiator against the rear face of the automobile windshield, or against the feet of the driver, independently of the main stream of air issuing from the heater. Such separate stream of air is directed against the inner face of the windshield in order to remove any condensed moisture in the form of fog or the like that tends to collect on the same, or to heat the windshield so as to melt snow or ice collected on the same, and is directed towards the feet of the driver in order to keep his feet warm and to offset the discomfort of any leakage of cold air up through the foot pedal or other openings which may be found in the floor boards.

One popular way of accomplishing this result is to project the end of a tube over the front face of the heater and the opposite end of the tube adjacent the windshield so that a part of the heated air issuing from the face of the heater will be blown into contact with the inner face of the windshield. In some installations a motor driven fan is inserted in this tube in order to increase the volume of air flowing through it to the windshield. Such types of devices are not meeting with great favor for the reason that they materially reduce the main stream of air flowing from the heater and are necessarily of a more or less accessory proposition which creates an impression that the device is something that is added to the heater as an afterthought.

In the more popular types of devices an auxiliary fan is built into the heater proper and discharges an independent stream of heated air through a tube to the windshield or other point at which it is desired to discharge it. These devices being of a built-in nature are more favored and are usually more efficient. These later types of devices as heretofore designed, as far as I am aware, are not as highly efficient as desired and additionally have been embodied in a necessarily bulky structure interfering with the leg room in the front or driver's compartment of an automobile, necessarily reduce the efficiency of the main heater to a considerable extent, and do not provide the desired volume of flow in the auxiliary air stream. One reason for this is that in at least one of the types of built-in devices heretofore offered for sale the auxiliary fan is positioned in the rear of the motor which drives the main fan as well as the auxiliary fan and this necessitates that the air for the auxiliary fan must be drawn over the motor in passing from the radiator to the auxiliary fan, making a relatively long and tortuous path for the auxiliary air to flow through, and unless the conduits for the auxiliary air flowing from the radiator to the auxiliary fan are exceptionally small it increases the bulk of the device and particularly its transverse dimensions to an undesirable extent. For this reason the resulting structure is such as to make it necessary to cut a hole through the automobile dash of a size commensurate with substantially the maximum external dimensions of the heater where it is desired to project a portion of the heater through the dash into the engine compartment in order to increase the leg room in the driver's compartment.

In accordance with the present invention a type of automobile body heater provided with a built-in auxiliary fan is provided which decreases the efficiency of the heater for heating the main body of air in the automobile very little if any over a correspondingly sized heater of conventional construction without the auxiliary fan feature, and at the same time is so constructed and arranged as to provide an auxiliary air stream of greatly increased volume as compared to heretofore designed constructions. This is accomplished by drawing such air through the central portion of the radiator or its core instead of passing the auxiliary air through the peripheral portion of the radiator or heat transfer element as heretofore suggested. The central portion of the radiator is relatively inefficient in conventional constructions employing an axial type of fan for forcing air through the radiator inasmuch as such fan does not create any substantial flow of air adjacent the area of the hub thereof. Accordingly, as far as this phase of the present invention is concerned the central portion of the radiator core which is very inefficient in conventional constructions is employed solely for heating the auxiliary air stream, thus having the effect of increasing the capacity of the radiator as compared to conventional constructions.

Furthermore in accordance with the present invention the auxiliary fan instead of being provided in the rear of the motor driving the main fan, is provided between the motor and the radiator, and between the main fan and the motor and is provided with a cooperating casing which, of course, is in the rear of the main fan and, accordingly, does not interfere with the proper free flow of air to the main fan. The auxiliary fan is preferably, although not necessarily, of the centrifugal type and a duct is provided between the central portion of the radiator core and the casing to provide for a proper flow and volume of air to the auxiliary fan which discharges the air from the casing to the desired point of distribution. By placing the auxiliary fan in advance of the motor the rear end of the heater assembly may be made relatively small and so as to permit at least the motor portion of the assembly to be projected through the cooperating dash and into the engine compartment of the automobile without requiring an opening of substantially greater size than the motor itself. Furthermore, and particularly where the auxiliary fan is of the centrifugal type under which circumstances it may be made relatively small in diameter, that portion of the assembly including the auxiliary fan and its casing may also be projected through the dash of the automobile and still without cutting an opening in the dash of a size commensurate with the maximum external dimensions of the heater assembly as has been necessary in heretofore designed structures of this general types.

In accordance with a further phase of the present invention the main fan and the auxiliary fan are formed as a unit and supported and driven by the motor as a unit. In other words, the blades for the main fan are mounted upon the auxiliary fan where such is of a centrifugal type. This is of advantage in connection with economy in manufacture but additionally the open edge of the centrifugal fan may be extended to form the duct through which the heated air from the central portion of the radiator is drawn rearwardly to the centrifugal fan. It will thus be understood that a structure may be formed in accordance with the present invention that is simple in construction, efficient in operation, and economical to manufacture.

Referring now to the accompanying drawings, in Fig. 1 is shown an automobile having a dash 12, a windshield 14, shown by way of illustration as of the divided type, and an instrument panel 16. The heater assembly is shown generally at 17 it being understood that it is supported from the dash 12 and that the main flow of heated air therefrom is discharged through its front face, past the usual shutters 18, where employed. The auxiliary air stream from the heater 16 is shown by way of illustration as being discharged through a tube 20 to a Y 22 from which the branches 24 lead to nozzle-like members 26 which project through openings therefor in the upper edge of the instrument panel 16 and in a position to direct the heated air therefrom against the inner face of the windshield 14 on the opposite sides of the center thereof.

Referring now to Figs. 2 to 6, inclusive, the heat exchanger or radiator element per se, indicated generally at 27, as in conventional constructions includes a pair of spaced headers and interconnected passages for the flow of heating medium between them. This heating medium may, of course, be any suitable substance but preferably in accordance with conventional constructions is either heated water from the internal combustion engine which drives the cooperating automobile or steam which is formed as a result of the operation of the engine. The headers may be arranged either at the top and bottom or at the side and the interconnecting passages may be either tubes of either round or flat section or of that type of construction commonly known as honeycomb. As a matter of illustration the particular radiator shown comprises transversely spaced headers 28 one arranged at each side of the heater and interconnected tubes 30 shown of the flattened type with the plane of thickness of the tube arranged in parallel relation to the axis of the heater. The tubes 30 are preferably arranged in staggered relation as illustrated best in Fig. 2. Preferably the tubes 30 carry a plurality of spaced heat exchange fins 32 thereon in accordance with conventional practice. Heating medium is introduced into one of the headers 28 through a rearwardly extending tube 34 connected into one of the headers 28 adjacent one end thereof and is discharged from the opposite end of the opposite heater through a similar tube 36, it being understood that the tubes 34 and 36 project forwardly through the dash 12 of the automobile and are there connected with a suitable source of heating medium and in such a manner as to cause a circulation of heating medium through the radiator 27.

The radiator 27 is supported in a frame-like element 50. The frame element 50 shown is of rectangular shape conforming to the particular shape of radiator shown by way of illustration, and is formed from flat sheet metal and is of such vertical dimensions that the upper and lower edges of the radiator 27 are snugly received between the forward edges thereof. Because of the header 28 at the sides of the radiator 27 the forward marginal portions of the side members of the frame element 50, which are also horizontally spaced to snugly receive the corresponding sides of the radiator 27 between them, are bent upwardly as at 52 to form flanges which abut against the rear face of the corresponding header 28 and thus serve to limit rearward movement of the radiator 27 with respect to the frame 50. The flanges 52 are each cut away at one end to provide for passage of the corresponding tube 34 or 36 therepast.

The heater assembly is provided with an ornamental casing portion indicated generally at 54 which encloses the radiator 27 and forms a shroud for the main fan which will hereinafter be described. This casing 54 is formed in two parts, namely 56 and 58 as best illustrated in Fig. 2, which parts are provided with telescopically engaging marginal edge portions removably secured together by means of screws 60. The front casing portion 56 is provided with a central rectangular opening 62 through which the air heated by the radiator 27 is discharged, the metal of the casing 56 surrounding the opening 62 being inwardly turned as at 64 into abutting relation with respect to the marginal edge portions of the forward face of the radiator 27. The doors 18 may be suitably hinged to the flange portion 64 so as to enable the effective area of the opening 62 to be controlled and to aid in the directional distribution of the main stream of air issuing from the radiator 27.

The rear casing part 58 extends into rearwardly spaced relation with respect to the rear face of the radiator 27 and its rear face is formed to provide a circular opening 66 therein, the metal around such opening being forwardly bent as at 68 to hook over the rear edge of the frame 50 at the center of each side and at the top and bottom thereof. The radiator 27 and frame 50 are thus clamped in assembled relationship between the rear edge of the marginal flange 64 at the forward edge of the casing part 56 and which flange abuts against the forward face of the radiator 27, and the rear wall of the rear casing part 58 against which the rear edge of the frame member 50 abuts, the flanges 52 on the frame member 50 in abutting against the headers 28 preventing further telescoping effect between the radiator 27 and the frame member 50.

In order to support the heater assembly from the dash 12 and to support the fans and driving motor with respect to the radiator 27 a strap member 76 is provided. The strap member 76 is of more or less U-shaped formation with the forward edges thereof projecting through suitable openings 78 formed at diametrically opposite points in the rear casing part 58 and into contacting relationship with respect to the interior face thereof to which such ends are preferably rigidly secured as by spot-welding or the like. The strap 76, of course, extends rearwardly from the casing half 58 and the driving motor 80, which is preferably of the electric type, is secured to the bottom of the U thereof by means of screws or bolts 82. Preferably a pad of rubber such as 84 is interposed between the straps 76 and the motor 80 so as to lessen the transmission vibration from one to the other.

The motor 80 is provided with a driving shaft 86 to which a fan assembly forming one feature of the present invention is supported and drivingly secured. The fan assembly comprises in part a conventional type of centrifugal fan 88 having impeller blades 90 struck out from the peripheral portions thereof also forming openings therethrough as in conventional constructions, but in accordance with the present invention the centrifugal fan portion 88 is provided with a forwardly extending portion 92 at its open end and in which portion no blades such as the blades 90 or corresponding openings are provided and which serves, at least partially, as the inlet duct for the flow of air to the centrifugal fan 88. A plurality of axial type of fan blades 94 are formed at the forward edge of the extension 92 which is substantially mid-way between the forward edge of the centrifugal fan portion 88 and the rear face of the radiator 27 and so that their peripheral portions are approximately aligned with the margins of the openings 66 in the back part 58 of the casing 54 which serves as a shroud for the fan blades 94. In the particular construction shown the extended duct portion 92 of the centrifugal fan 88 is extended by means of a cylindrical collar or sleeve part 96 which is telescopically received within the forward edge of the extension 92 and, therefore, extends the duct portion 92 up into close proximity with the rear face of the radiator 27. Preferably the collar 96 is flared outwardly as at 98 adjacent such rear face of the radiator 27 and is flared inwardly as at 100 at its rear end, this latter feature enabling the centrifugal fan 88 to better build up a pressure therein.

A conventional form of centrifugal fan housing 110 is provided around the centrifugal fan portion 88. In other words the outer face of the casing or housing 110 is of spiral conformations as best illustrated in Fig. 3 and is provided with a discharge connection 112 in the instance shown directed laterally from the heater so as to provide a connection for the duct 20 previously described and which leads to the windshield 14. The housing 110 is provided with an opening 114 in its forward face through which the extension 92 of the centrifugal fan 88 projects in close but freely spaced relation and the rear face of the housing 110 is sealed against the escape of air between it and the motor 80 by means of an annular gasket 116, preferably formed of rubber, interposed between them. The housing 110 is mounted relative to the motor 80 and fan 88 by being suitably secured to the strap 76 preferably by screws such as 118. In the preferred form rubber sleeves such as 120 insulate the screws 188 from the straps 76 and the straps 76 from the housing 110 in order to insulate these members from one another against the transmission of audible sounds between them.

The heater assembly may be supported from the dash 12 by means of bolts 124 projecting through the base of the strap 76 and the dash 12 and provided with nuts 126 on the forward face of the dash 12. This is perhaps the simplest form of mounting the assembly although in such case it will be apparent that there is a minimum amount of leg room in the driver's compartment between the forward edge of the front seat and the face of the heater assembly. Should it be desired to increase this leg room, an opening may be cut in the dash 12 large enough to permit the motor 80 and the corresponding portion of the strap 76 to be projected therethrough in which case the assembly may be projected through the dash until the fan housing 110 contacts the forward face of the dash. Such an arrangement is illustrated in dotted lines at 12' in Fig. 2. When such an arrangement is provided suitable bolts not shown may be projected through the dash 12' and into the casing 110 in order to support the assembly or suitable securing flanges may be provided on the strap 76 for that purpose. It will be apparent from an inspection of Fig. 3, as well as Fig. 2, that where the motor 80 and corresponding portions of the strap 76 are projected through the dash in order to increase the leg room in the driver's compartment of the automobile it will not require an excessively large opening to permit these parts to project through the dash, such opening in any case being materially smaller than the projected transverse area of the heater assembly as a whole and as would have been required in heaters as heretofore constructed. On the other hand, if desired, the assembly may be projected through the dash to a greater extent and even to a point where the housing 110 for the auxiliary fan 88 is projected partially or wholly into the engine compartment and yet not require an opening in the dash of a size commensurate with the projected transverse area of the heater assembly. As will be apparent this feature of the present invention is particularly important particularly where such heaters may be provided as part of standard equipment on an automobile.

It will, of course, be understood that in operation, and assuming that a flow of heating medium is being circulated through the radiator 27, when the motor 80 is energized it will cause the centrifugal fan portion 88 and the blades 94, together with the remaining parts constituting the fan unit, to rotate. The fan blades 94 in rotating will draw air in through the rear face of the casing 54 on each side of the straps 76 and outwardly of the extended portion 92 of the centrifugal fan 88 and the sleeve 96 and will force it forward through the core of the radiator 22 and in passing therethrough will be heated and in being discharged therefrom will be directed by the doors 18 as desired. At the same time the operation of the centrifugal fan 88 will cause a suction to be built up therein and within the sleeve 96 the effective force of which suction will be transmitted through the central portion of the core of the radiator 27. This suction of the centrifugal fan 88 will cause air to be drawn inwardly through the central portion of the radiator 27 in a direction reverse to that through which air is forced through it by the fan blades 94 and in passing through the radiator will be heated and drawn into the centrifugal fan 88 from which it will be discharged under pressure to within the housing 110 and thence discharged through the connection 112 and ducts or tubes 20 and 24 to the windshield 14. If desired an axial flow type of propeller 130 may be inserted within the sleeve 96 and fixed to rotate therewith, so as to accentuate the flow of air through the radiator 27 to the sleeve 96 and through the sleeve 96 to the centrifugal fan 88, thus giving a two stage effect to the pumping action on the auxiliary air column moved thereby. Ordinarily, however, the fan 130 will not be required and the present invention is not to be understood to be limited thereto in its broader aspects.

As previously mentioned the central portions of an axial type of fan blade are relatively inefficient for the purpose of moving the corresponding portion of a body of air so than in conventional constructions the flow of air through the central portion of the radiator core is negligible and the heating effect resulting therefrom is also negligible. This effect is accentuated in conventional constructions because of the fact that the stream of air discharged by the fan takes more or less of the form of a hollow cone of air spreading outwardly from the forward face of the heater. In the present case, therefore, the suction effect of the centrifugal fan 88 is effective upon the hollow core of such cone of air and while the air drawn through the central portion of the heater and discharged through the centrifugal fan 88 may include a small portion of air which has immediately previously passed forwardly through the core by reason of the action of the fan blades 94 thereupon and has been heated thereby, it has been found in practice that the bulk of such air is what may be termed relatively cold air which has not immediately previously been forced through the radiator by the main fan blades 94. For this reason the passing of the auxiliary stream of air through the radiator 27 in reality lowers the efficiency thereof as far as the main air stream is concerned and as compared to a conventional construction having a radiator of equivalent size, very little, if any.

It is not necessary that the sleeve portion 96 or equivalent thereof be secured for equal rotation with the fan unit in all cases. For instance in the modification illustrated in Fig. 7 a sleeve portion 96' corresponding to the sleeve 96 previously described is shown as being fixed to the rear face of the radiator 27 and as extending rearwardly therefrom and projecting to within the interior of the forward extension 92 of the centrifugal fan 88, but in inwardly spaced relation with respect thereto. As will be apparent the effect of this modification will be substantially identical to that in the construction previously described in that the sleeve 96 provides a duct between the central portion of the core of the radiator 27 and the centrifugal fan 88 which separates the main stream of air flowing forwardly through the radiator from the auxiliary stream that flows rearwardly through the central portion thereof to be heated thereby and discharged in an auxiliary air stream for auxiliary purposes.

It will, of course, be apparent that when the teachings of the present invention are disclosed to those skilled in the art many modifications and changes will be apparent from the teachings herein and, accordingly, it will be understood that formal changes may be made in the specific embodiments of the invention described without departing from the spirit or substance of the broad invention, the scope of which is commensurate with the appended claims.

What I claim is:

1. In an automobile body heater, a substantially vertical forwardly facing radiator, a unitary fan member rotatably mounted about a substantially horizontal axis in back of said radiator, said unitary fan member including a centrifugal fan having a substantially circular extension thereon and a tubular member telescoped therein and forming the centrifugal fan inlet, said unitary fan member also including blade members on said extending portion and extending radially outwardly beyond the outer periphery of said centrifugal fan, said blade members being positioned forwardly of said centrifugal fan, and a motor for driving said unitary fan member mounted rearwardly of said centrifugal fan.

2. In an automobile body heater, a substantially vertical forwardly facing radiator, a unitary fan member rotatably mounted about a substantially horizontal axis in back of said radiator, said unitary fan member including a centrifugal fan, an extension on said centrifugal fan adjacent the inlet end thereof, and blade members forming a propeller fan secured to said extension, a member substantially circular in cross section fixedly secured to said fan member for rotation therewith, said last named member extending to a position in proximity to the rear face of said radiator substantially centrally thereof, propeller blades carried by and extending inwardly from said last named member, and a housing for said centrifugal fan forming a discharge conduit.

3. In an automobile body heater assembly, in combination, a radiator, a propeller for forcing air through said radiator, a centrifugal fan located on that side of said propeller remote from said radiator, an inlet duct for said centrifugal fan rotatable therewith and projecting through said propeller, a tubular member telescoped into and fixed in said inlet duct and extending into proximity with a face of said radiator, a propeller blade carried by and extending inwardly from said tubular member and rotatable therewith for aiding the flow of air through said duct to said centrifugal fan, and means for driving said propellers and fan.

4. As an article of manufacture, a fan unit comprising a substantially cylindrical portion having one of its ends substantially closed, longitudinally extending slots having vanes associated therewith adjacent the said closed end forming a centrifugal fan, said slots terminating a substantial distance in from the other end of said cylindrical member to provide an extension beyond said slots forming an inlet duct for said centrifugal fan, outwardly directed blade members secured to said last named portion forming a propeller fan, and a tubular member telescoped into said inlet duct and forming an extension thereof, said tubular member being contracted at its inner end and flared at its outer end.

LAMBERT M. PAYNE.